(12) United States Patent
Saito

(10) Patent No.: US 10,994,332 B2
(45) Date of Patent: May 4, 2021

(54) LAMINATION MOLDING APPARATUS

(71) Applicant: Sodick Co., Ltd., Kanagawa (JP)

(72) Inventor: Tsuyoshi Saito, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 106 days.

(21) Appl. No.: 16/678,118

(22) Filed: Nov. 8, 2019

(65) Prior Publication Data

US 2020/0188998 A1 Jun. 18, 2020

(30) Foreign Application Priority Data

Dec. 14, 2018 (JP) ................................ 2018-234241

(51) Int. Cl.
| | |
|---|---|
| B29C 67/00 | (2017.01) |
| B22F 3/10 | (2006.01) |
| B22F 3/105 | (2006.01) |
| B22F 3/24 | (2006.01) |
| B33Y 30/00 | (2015.01) |

(52) U.S. Cl.
CPC .......... *B22F 3/1028* (2013.01); *B22F 3/1055* (2013.01); *B22F 3/24* (2013.01); *B22F 2003/1057* (2013.01); *B22F 2003/248* (2013.01); *B33Y 30/00* (2014.12)

(58) Field of Classification Search
CPC ......... B33Y 30/00; B29C 64/00; B29C 64/20; B29C 64/30; B29C 64/379
See application file for complete search history.

(56) References Cited

U.S. PATENT DOCUMENTS

| | | |
|---|---|---|
| 2008/0277830 A1 | 11/2008 | Balboni et al. |
| 2017/0120332 A1 | 5/2017 | DeMuth et al. |
| 2017/0120333 A1 | 5/2017 | DeMuth et al. |
| 2017/0120518 A1 | 5/2017 | DeMuth et al. |

(Continued)

FOREIGN PATENT DOCUMENTS

| | | |
|---|---|---|
| CN | 207709867 U | 8/2018 |
| JP | 2017-214611 A | 12/2017 |

(Continued)

OTHER PUBLICATIONS

Japanese Office Action dated Mar. 31, 2020, in connection with corresponding JP Application No. 2018-234241 (6 pgs., including machine-generated English translation).

(Continued)

*Primary Examiner* — Thu Khanh T Nguyen
(74) *Attorney, Agent, or Firm* — Maier & Maier, PLLC

(57) ABSTRACT

A lamination molding apparatus includes an irradiator, a processing unit, and a cooling device. The irradiator irradiates a material layer with a beam to form a solidified layer. The processing unit includes a processing head having a tool that performs processing on the solidified layer, and a processing head driver moving the processing head at least in a horizontal direction. The cooling device is provided in the processing head and cools at least a part of a solidified body including an upper surface to a predetermined cooling temperature, and the solidified body is formed by laminating the solidified layer. The cooling device includes a cooling plate having a cooling surface being cooled to the cooling temperature, and the cooling surface is in close contact with the upper surface of the solidified body in a recumbent state with the cooling surface along the horizontal direction.

12 Claims, 15 Drawing Sheets

(56) References Cited

U.S. PATENT DOCUMENTS

| | | |
|---|---|---|
| 2017/0297105 A1 | 10/2017 | Kawada et al. |
| 2018/0281280 A1 | 10/2018 | Solorzano et al. |
| 2019/0061001 A1 | 2/2019 | Araie et al. |

FOREIGN PATENT DOCUMENTS

| | | |
|---|---|---|
| JP | 6295001 B1 | 3/2018 |
| TW | 200728048 A | 8/2007 |
| TW | 201726363 A | 8/2017 |
| WO | 2018/187472 A1 | 10/2018 |

OTHER PUBLICATIONS

Office Action dated Feb. 5, 2020, in corresponding Taiwanese Application No. 108141304; 11 pages.

LAMINATION MOLDING APPARATUS

CROSS-REFERENCE TO RELATED APPLICATION

This application claims priority to Japanese Patent Application, No. 2018-234241 filed on Dec. 14, 2018, the entire contents of which are incorporated by reference herein.

TECHNICAL FIELD

The present invention relates to a lamination molding apparatus.

BACKGROUND ART

There is a plurality of methods for metal lamination molding. For example, in powder bed fusion, a material layer made of material powder is formed on a molding table capable of vertical movement in a sealed chamber filled with inert gas. Then, a predetermined portion of the material layer is irradiated with a laser beam or an electron beam to melt or sinter the material layer at the irradiated position to form a solidified layer. In this way, the formation of the material layer and the solidified layer are repeated, and a plurality of solidified layers are laminated to produce a desired three-dimensional molded object. Here, the solidified layer includes a molten layer and a sintered layer. Further, the laminated solidified layer is called a solidified body.

In such metal lamination molding, temperature adjustment may be performed on a three-dimensional molded object after molding or a solidified layer in the middle of molding. For example, Japanese Patent No. 6295001 discloses a lamination molding method in which martensitic transformation is intentionally advanced each time one or more solidified layers are formed. In this method, tensile stress due to the contraction of the solidified layer(s) is reduced by compressive stress due to the martensitic transformation, and deformation due to residual stress of the molded object is suppressed. In this molding method, in order to advance the martensitic transformation intentionally, predetermined temperature control is performed on the solidified layer(s) each time one or more solidified layers are formed.

SUMMARY OF INVENTION

Technical Problem

When performing such a lamination molding method, the solidified layer is cooled and heated. Conventionally, the temperature control of the solidified layer has been performed by a temperature adjusting mechanism arranged in the molding table. Therefore, each time one or more solidified layers are formed, the entire laminated solidified body needs to be cooled and heated even if the solidified layer(s) requiring temperature control is only a part of the solidified body, and it takes a long time to adjust the temperature.

The present invention has been made in consideration of the afore-mentioned circumstances. An object of the present invention is to directly cool an upper surface of a solidified body with a cooling device having a relatively simple structure in the lamination molding of a three-dimensional molded object.

Solution to Problem

According to the present invention, provided is a lamination molding apparatus, comprising: an irradiator irradiating a material layer with a beam to form a solidified layer, the material layer being formed for each of a plurality of divided layers obtained by dividing a desired three-dimensional molded object at a predetermined height; a processing unit including a processing head having a tool that performs processing on the solidified layer, and a processing head driver moving the processing head at least in a horizontal direction; a cooling device provided in the processing head and cooling at least a part of a solidified body including an upper surface to a predetermined cooling temperature, the solidified body being formed by laminating the solidified layer; wherein the cooling device includes a cooling plate having a cooling surface being cooled to the cooling temperature, the cooling surface being in close contact with the upper surface of the solidified body in a recumbent state with the cooling surface along the horizontal direction.

Advantageous Effects of Invention

In the present invention, since a processing head is provided with a cooling device, the cooling device can be moved to a desired position using a processing head driving device that moves the processing head at least in a horizontal direction. Therefore, it is not necessary to provide another driving device for moving the cooling device in the horizontal direction. And the cooling device includes a cooling plate which is close contact to an upper surface of a solidified body. Therefore, the upper surface of the solidified body can be directly cooled by the cooling device having a relatively simple structure.

DESCRIPTION OF EMBODIMENTS

Figure 1:
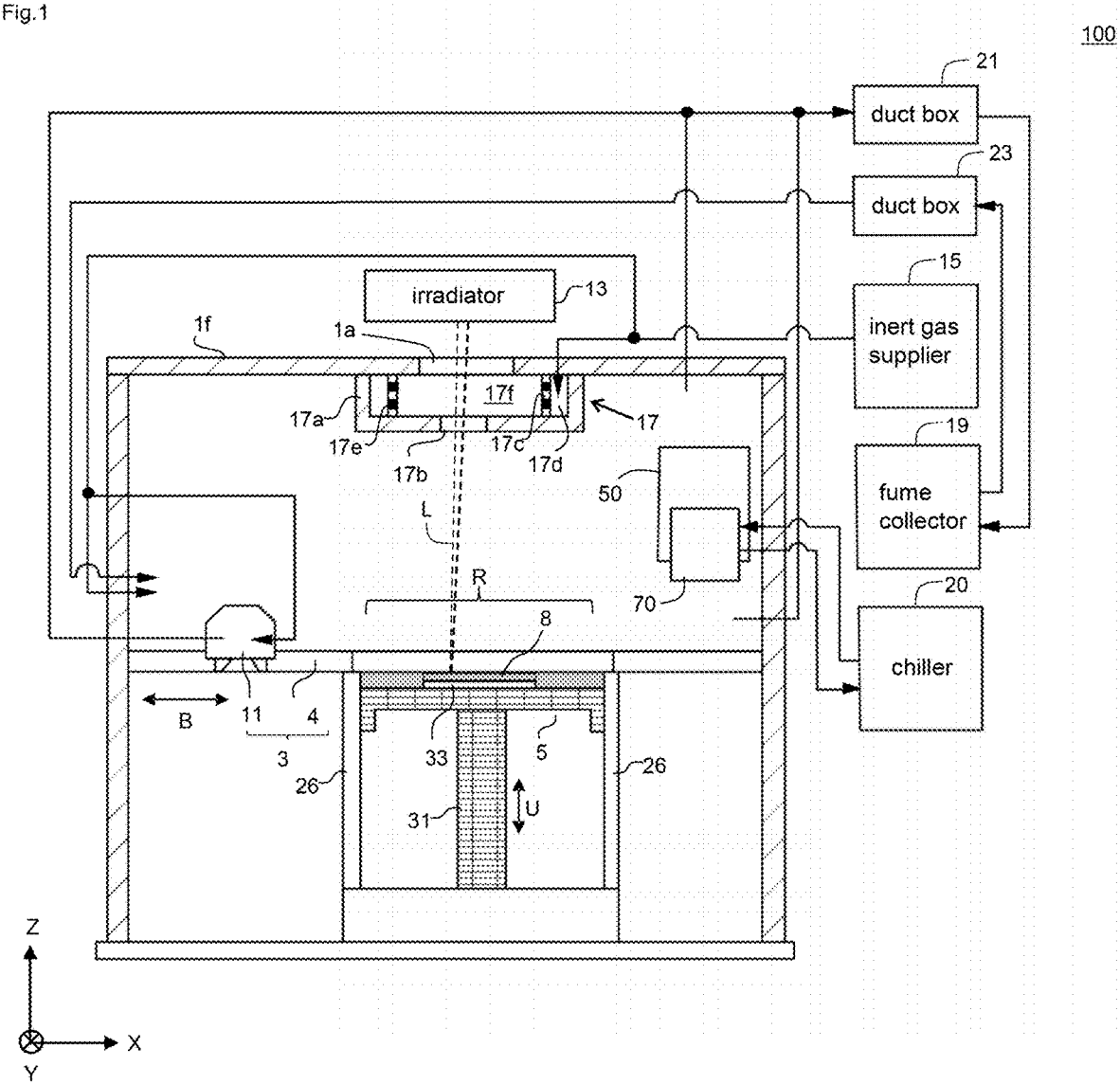
FIG. 1 is a schematic front view of a lamination molding apparatus 100 according to an embodiment of the present invention.
Figure 2:
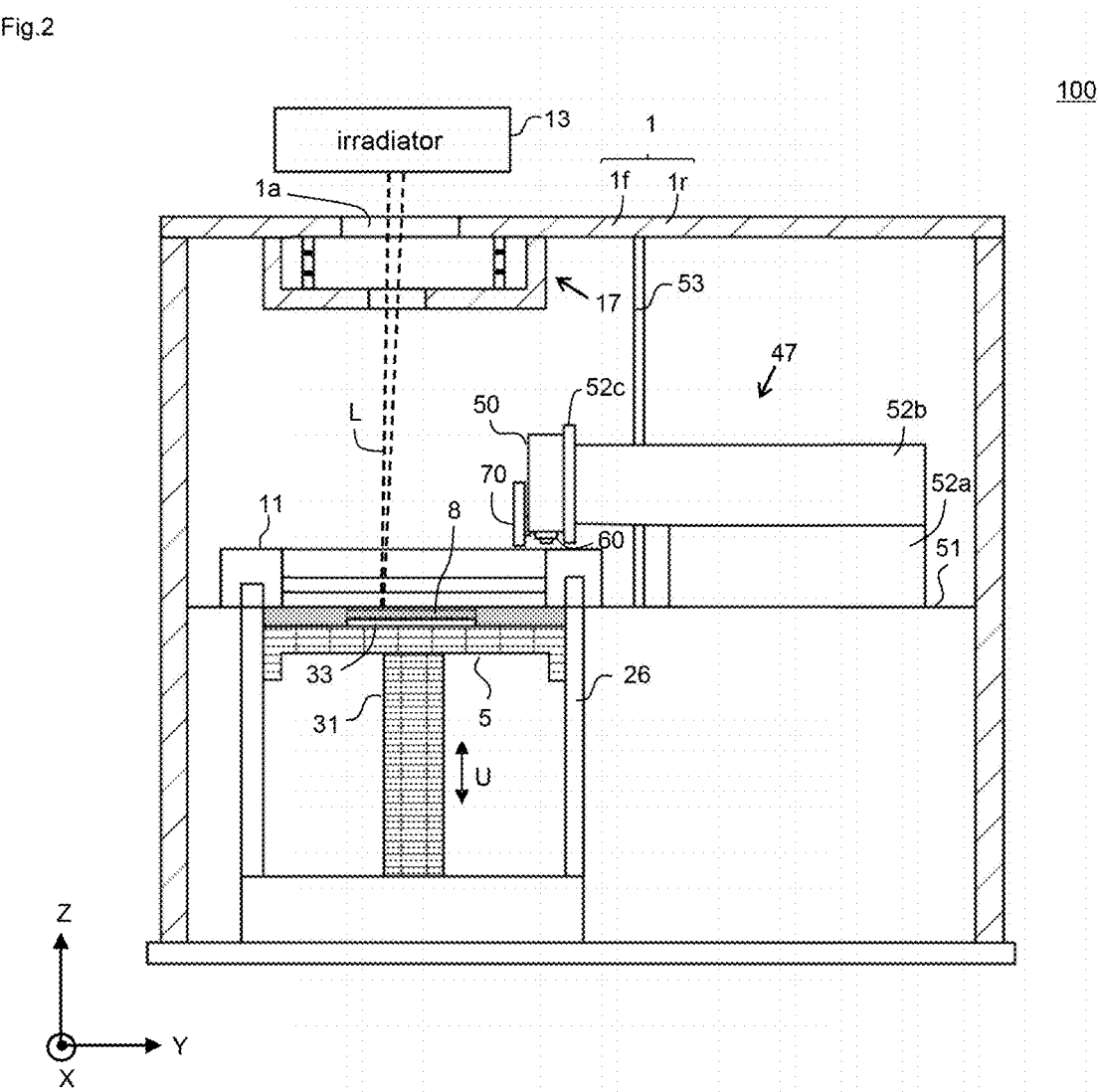
FIG. 2 is a schematic side view of the lamination molding apparatus 100 according to the embodiment of the present invention.

Hereinafter, the embodiments of the present invention will be described with reference to the drawings. The characteristic matters shown in the embodiments described below can be combined with each other. Moreover, each characteristic matter independently constitutes an invention. In the following description, directions of an X-axis, a Y-axis, and a Z-axis are defined as in FIG. 1 and FIG. 2. Specifically, a predetermined horizontal one-axis direction, which is a left-right direction in FIG. 1 and a front-rear direction in FIG. 2, is defined as the X-axis. Another horizontal one axis direction orthogonal to the X axis, which is a front-rear direction in FIG. 1 and a left-right direction in FIG. 2, is defined as the Y-axis. A predetermined vertical one-axis direction which is an up-down direction in FIG. 1 and FIG. 2 is defined as the Z-axis.

A lamination molding apparatus 100 according to the embodiment of the present invention repeats a step of forming a material layer 8 and a step of irradiating a irradiation region of the material layer 8 with a beam, for example a laser beam L, to melt or sinter the material layer 8 and form a solidified layer. A plurality of the solidified layers is laminated to produce a three-dimensional molded object having a desired shape.

The lamination molding apparatus 100 of the present invention includes a chamber 1, an irradiator 13, a material layer forming device 3, a processing unit 47, and a cooling device 65. FIG. 1 is a schematic front view of the lamination molding apparatus 100, and FIG. 2 is a schematic side view of the lamination molding apparatus 100. The chamber 1 covers a predetermined molding region R and is filled with inert gas having a predetermined concentration. The chamber 1 is partitioned into a front chamber 1*f* and a rear chamber 1*r* by a partition 53. The partition 53 is, for example, comprised of telescopic bellows. In the front chamber 1*f*, the desired three-dimensional molded object is produced. The rear chamber 1*r* accommodates most part of a processing head driver 52 of the processing unit 47.

The material layer forming device 3 is provided in the front chamber 1*f*. In the molding region R, the material layer forming device 3 forms a material layer for each of a plurality of divided layers obtained by dividing the desired three-dimensional molded object at a predetermined height. The material layer forming device 3 includes a base 4 and a recoater head 11. In the present embodiment, the material layer 8 is made of material powder. The material powder is, for example, metal powder and has spherical shape with an average particle diameter of 20 μm.

The base 4 has the molding region R in which the desired three-dimensional molded object is formed. The molding region R is provided on a molding table 5. The molding table 5 can be moved in a vertical direction, which is showed as an arrow U in FIG. 1, by a molding table driving mechanism 31. In the present embodiment, when the lamination molding apparatus 100 is used, a base plate 33 may be disposed on the molding table 5 and the first material layer 8 is formed on the base plate 33. Here, an irradiation region of the material layer 8 is in the molding region R, and roughly matches an area defined by an outline shape of the desired three-dimensional molded object.

Powder retaining walls 26 are provided around the molding table 5. Unsolidified material powder is retained in a powder retaining space surrounded by the powder retaining walls 26 and the molding table 5. A powder discharging section capable of discharging the material powder in the powder retaining space may be provided below the powder retaining walls 26.

Inside the molding table 5, a temperature adjusting mechanism for adjusting a temperature of the molding table 5 is provided. The temperature adjusting mechanism includes a heater and a cooler provided inside the molding table 5. The heater is, for example, an electric heater or a conduit through which a heating medium flows. The cooler is, for example, a conduit through which a cooling medium flows. Here, the cooler of the temperature adjusting mechanism may have a structure capable of cooling to some extent, and may be capable of cooling to a temperature higher than a cooling temperature by the cooling device 65 described later. For example, the cooler can cool the molding table 5 to ordinary temperature, which is about 5° C. to 35° C.

Figure 3:
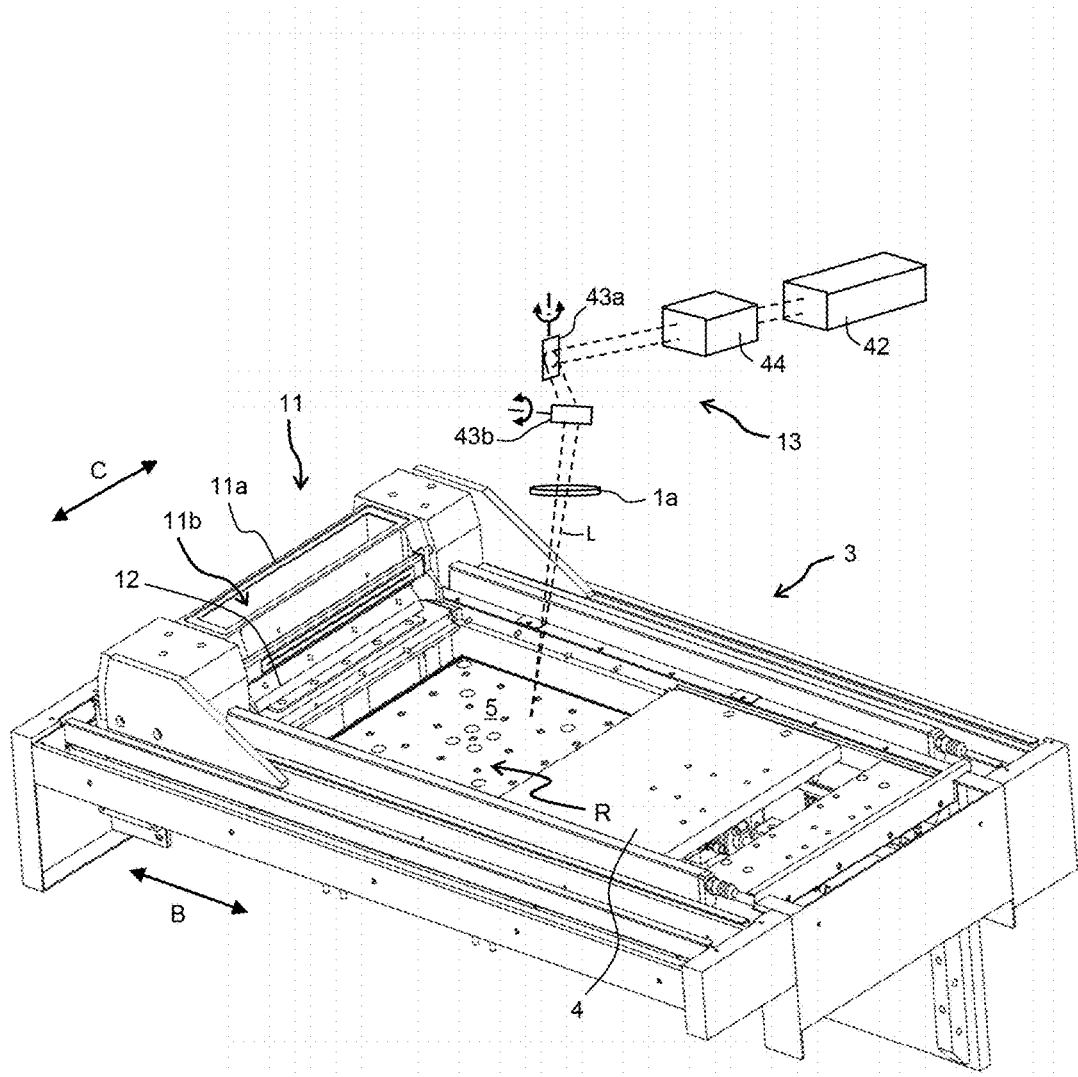
FIG. 3 is a schematic perspective view of a material layer forming device 3 and an irradiator 13 according to the embodiment of the present invention.

The recoater head 11 shown in FIG. 3, has a material holding section 11*a*, a material supplying section 11*b*, and a material discharging section. The material holding section 11*a* accommodates the material powder. The material supplying section 11*b* is provided on an upper surface of the material holding section 11*a* and serves as an opening receiving the material powder which is supplied from a material supplying device (not shown) to the material holding section 11*a*. The material discharging section is provided on a bottom surface of the material holding section 11*a* and discharges the material powder accommodated in the material holding section 11*a*. The material discharging section has a slit shape extending in a horizontal direction (showed as an arrow C), which is orthogonal to a moving direction (showed as an arrow B) of the recoater head 11. Further, blades 12 are provided on both side of the recoater head 11, respectively. The blade 12 spreads material powder. That is, the blade 12 planarizes the material powder discharged from the material discharging section to form the material layer 8.

The chamber 1 is supplied with the inert gas having the predetermined concentration. Further, inert gas containing fume generated when the material layer 8 is melted or sintered is discharged from the chamber 1. Preferably, the inert gas discharged from the chamber 1 is returned to the chamber 1 after the fume is removed. Specifically, a fume collector 19 is connected to the chamber 1 via an inert gas supplier 15 and duct boxes 21 and 23. Positions and a number of supply ports and discharge ports of the inert gas provided in the chamber 1 are not particularly limited. In the present invention, the inert gas does not substantially react with the material powder and is appropriately selected, according to a type of material, from nitrogen gas, argon gas, helium gas, etc.

The inert gas supplier 15 has a function of supplying inert gas. The inert gas supplier 15 is, for example, an inert gas generator that generates inert gas having the predetermined concentration from ambient air, or a gas cylinder in which inert gas having the predetermined concentration is stored. As the inert gas generator, various types of generator such as a membrane separation system and a PSA system can be adopted depending on the type and concentration of the generated inert gas. The inert gas supplier 15 supplies inert gas from the supply port provided in the chamber 1 and fills the chamber 1 with inert gas having the predetermined concentration. Here, it is desirable that the inert gas supplied from the inert gas supplier 15 is dry. Specifically, it is desirable that a dew point temperature of the inert gas is lower than the cooling temperature of the cooling device 65. Since a cooling plate 70 of the cooling device 65 described later moves in the chamber 1, condensation on the cooling plate 70 can be suppressed if the dry inert gas is filled in the chamber 1. That is, when the inert gas supplier 15 is the inert gas generator, the inert gas generator preferably includes a dryer drying air which is a raw material for generating the inert gas. Further, when the inert gas supplier 15 is the gas cylinder, it is desirable that sufficiently dry inert gas is stored in the gas cylinder.

The inert gas containing a large amount of the fume discharged from the discharge port of the chamber 1 is sent to the fume collector 19 and returned to the chamber 1 after removing the fume. The fume collector 19 needs to have a function of removing fume, and is, for example, an electric dust collector or a filter.

As shown in FIG. 2, the processing unit 47 includes a processing head 50 and the processing head driver 52 for driving the processing head 50. The processing head driver 52 includes a Y-axis driving unit 52b, an X-axis driving unit 52a, and a Z-axis driving unit 52c. The Y-axis driving unit 52b moves the processing head 50 disposed in the front chamber 1f in the Y-axis direction. The X-axis driving unit 52a is disposed on a bed 51 and moves the Y-axis driving unit 52b in the X-axis direction. The Z-axis driving unit 52c moves the processing head 50 in the Z-axis direction. A more specific constitution of the processing head driver 52 is exemplified below. The X-axis driving unit 52a includes an X-axis guide rail, an X-axis slider, and an X-axis moving body. The X-axis guide rail is fixed to the bed 51 and extends in the X-axis direction. The X-axis slider slides along the X-axis guide rail. The X-axis moving body is fixed to the X-axis slider. The Y-axis driving unit 52b includes a Y-axis guide rail, a Y-axis slider, and a Y-axis moving body. The Y-axis guide rail is fixed to the X-axis moving body and extends in the Y-axis direction. The Y-axis slider slides along the Y-axis guide rail. The Y-axis moving body is fixed to the Y-axis slider. The Z-axis driving unit 52c includes a Z-axis guide rail and a Z-axis slider. The Z-axis guide rail is fixed to the Y-axis moving body and extends in the Z-axis direction. The Z-axis slider slides along the Z-axis guide rail and fixes the processing head 50.

The processing head 50 has a spindle 60. The spindle 60 is configured so that a cutting tool, such as an end mill (not shown), can be attached on the spindle 60 and rotated. The spindle 60 can perform cutting of a surface or an unnecessary portion of the solidified layer obtained by solidifying the material layer 8. Preferably, plural types of the cutting tools are used, and the cutting tools can be exchanged during molding by an automatic tool changer (not shown). With such configuration, the processing head 50 can perform cutting on the solidified layer at a desirable position in the front chamber 1f.

Instead of the above-described embodiment, the processing unit may include a cutting head that holds a cutting tool such as a tool bit and rotates the cutting tool along a vertical rotation axis, and a processing head driver for driving the cutting head along horizontal directions. The processing head driver includes, for example, a pair of first horizontal movement mechanisms, a gantry provided in the pair of first horizontal movement mechanisms, and a second horizontal movement mechanism attached to the gantry and having the processing head fixed thereto. At this time, the processing head driver may not have a driver that moves the processing head in the Z-axis direction. The processing head driver may be configured to be capable of moving the processing head at least in one horizontal direction.

The irradiator 13 is provided above the front chamber 1f. The irradiator 13 irradiates a predetermined portion of the material layer 8 formed on the molding region R with the beam such as the laser beam L to melt or sinter the material layer 8 at an irradiated position, and to form the solidified layer. As shown in FIG. 3, the irradiator 13 includes a light source 42, a scanner, and a focus control unit 44. The scanner is specifically a galvanometer scanner and includes galvanometer mirrors 43a and 43b and actuators (not shown) for rotating each of the galvanometer mirrors 43a and 43b, respectively.

The light source 42 emits the laser beam L. Here, the laser beam L is capable of sintering or melting the material powder, and is, for example, a $CO_2$ laser, a fiber laser, a YAG laser.

The focus control unit 44 focuses the laser beam L output from the light source 42 to adjust it to a desired spot diameter. The galvanometer mirrors 43a and 43b control to scan two-dimensionally the laser beam L output from the light source 42. Rotational angles of the galvanometer mirrors 43a and 43b are controlled in accordance with magnitudes of rotational angle control signals input from a control device (not shown). With this feature, it is possible to irradiate a desired position with the laser beam L by changing the magnitude of the rotation angle control signal input to each actuator of the galvanometer scanner.

The laser beam L passed through the galvanometer mirrors 43a and 43b is transmitted through a protective window 1a provided in the front chamber 1f, and the material layer 8 formed in the molding region R is irradiated with the laser beam L. The protective window 1a is made of material that can transmit the laser beam L. For example, if the laser beam L is the fiber laser or the YAG laser, the protective window 1a can be made of quartz glass.

The irradiator may be configured to irradiate the material layer 8 with an electron beam. The electron beam melts or sinters the material layer 8 to form the solidified layer. For example, the irradiator includes a cathode electrode, an anode electrode, a solenoid, and a collector electrode. The cathode electrode emits electrons. The anode electrode converges and accelerates the electrons. The solenoid generates a magnetic field to converge the electron beam in one direction. The collector electrode is electrically connected to the material layer 8. A voltage is applied between the cathode electrode and the collector electrode.

A protective window contamination prevention device 17 is provided on an upper surface of the front chamber 1f so as to cover the protective window 1a. The protective window contamination prevention device 17 includes a cylindrical housing 17a and a cylindrical diffusion member 17c disposed in the housing 17a. An inert gas supply space 17d is provided between the housing 17a and the diffusion member 17c. On the bottom of the housing 17a, an opening 17b is provided inside the diffusion member 17c. The diffusion member 17c is provided with a large number of pores 17e, and the clean inert gas supplied into the inert gas supply space 17d fills a clean room 17f through the pores 17e. The clean inert gas filled in the clean room 17f is ejected to downward direction of the protective window contamination prevention device 17 through the opening 17b.

Figure 4:
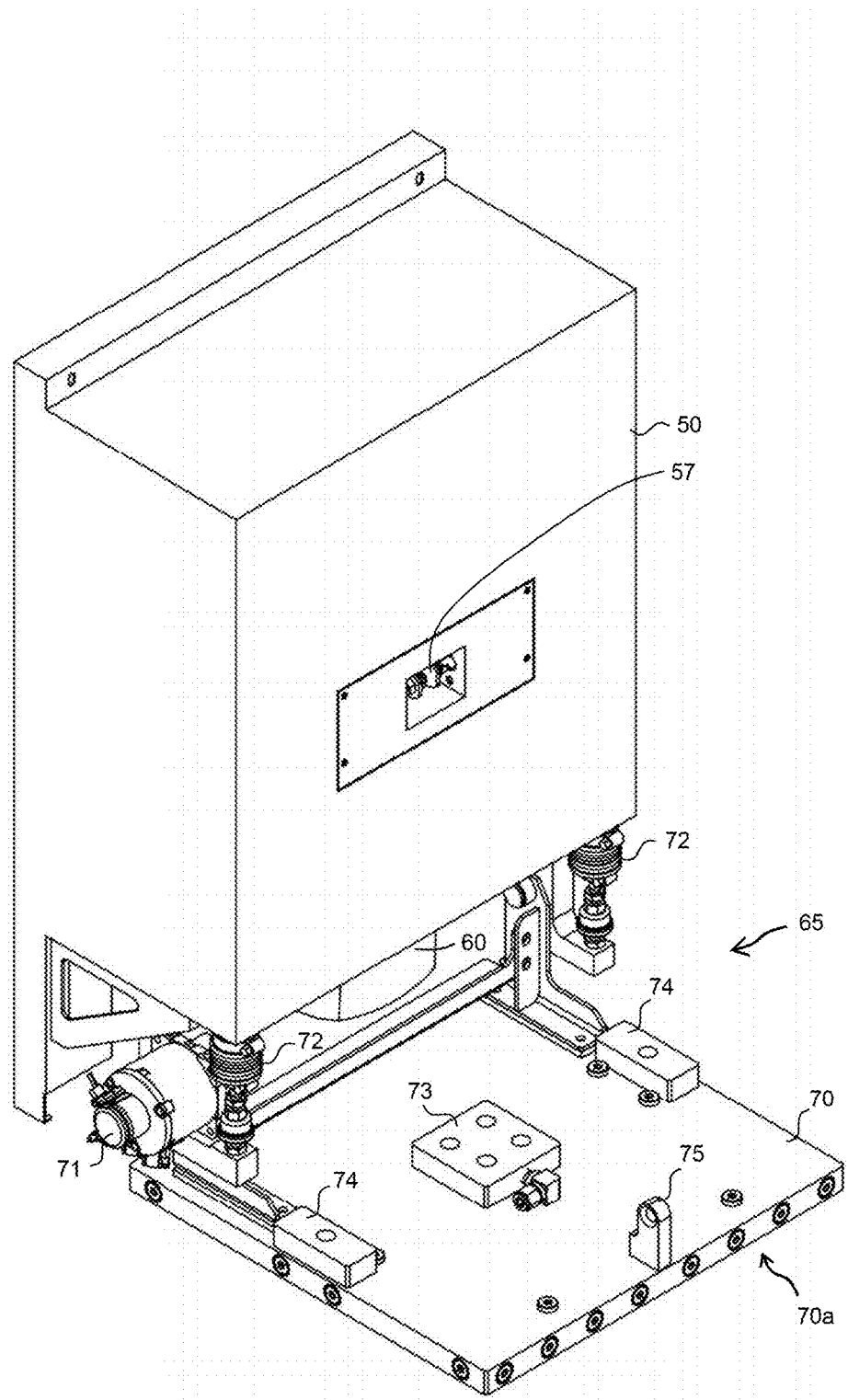
FIG. 4 is a perspective view of a processing head 50 according to the embodiment of the present invention.
Figure 5:
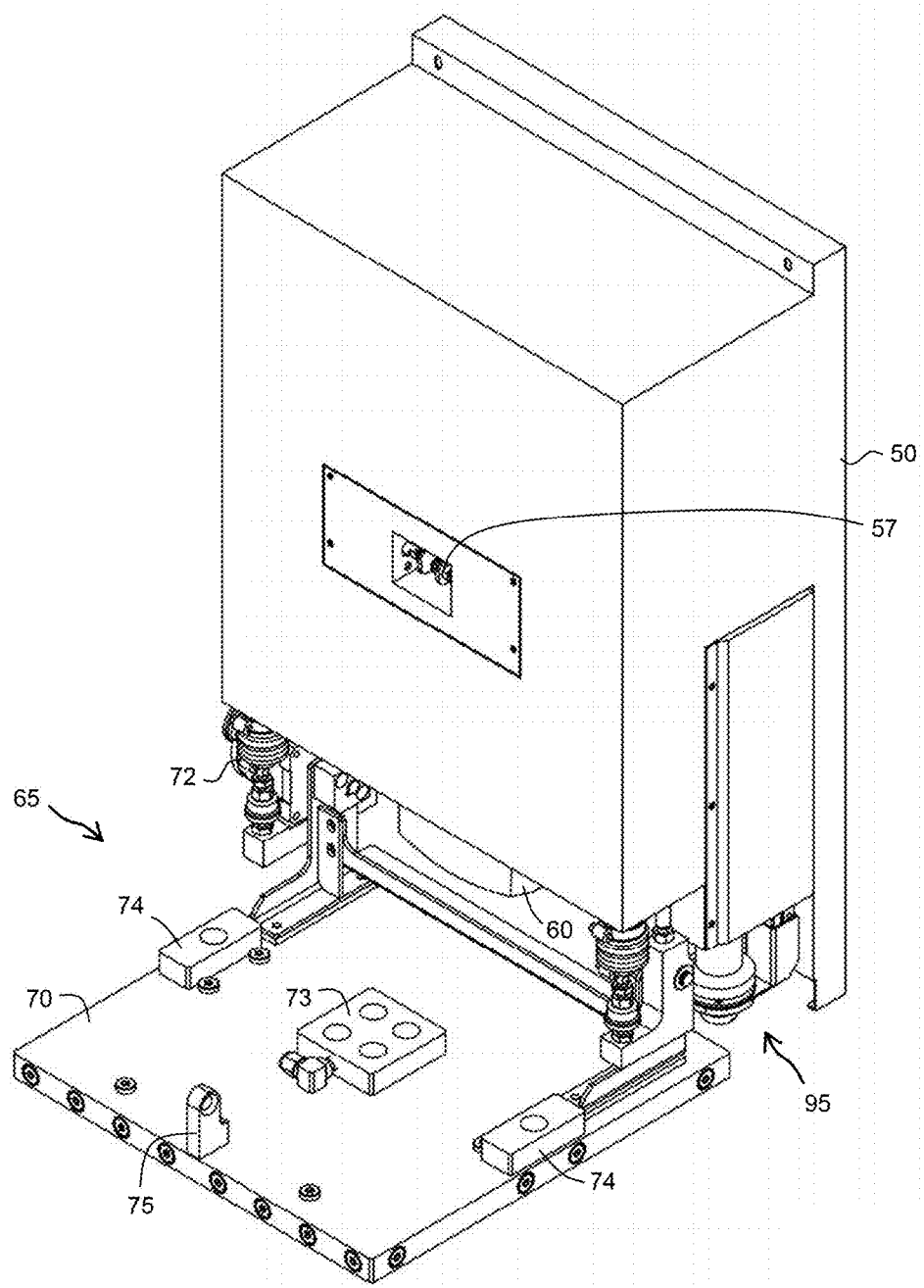
FIG. 5 is another perspective view of the processing head 50 according to the embodiment of the present invention.

As shown in FIG. 4 and FIG. 5, the processing head 50 according to the embodiment of the present invention is provided with the cooling device 65. The cooling device 65 has the cooling plate 70. The cooling plate 70 has a cooling surface 70a. The cooling surface 70a is in close contact with an upper surface of the solidified body 81 to cool. The solidified body 81 is laminated with the solidified layer formed by irradiating the material layer 8 with the beam such as the laser beam L. Specifically, the cooling surface 70a is a lower surface of the cooling plate 70. Here, the upper surface of the solidified body 81 means an upper surface of the uppermost solidified layer at the time when cooling by the cooling device 65 is performed.

Figure 6:
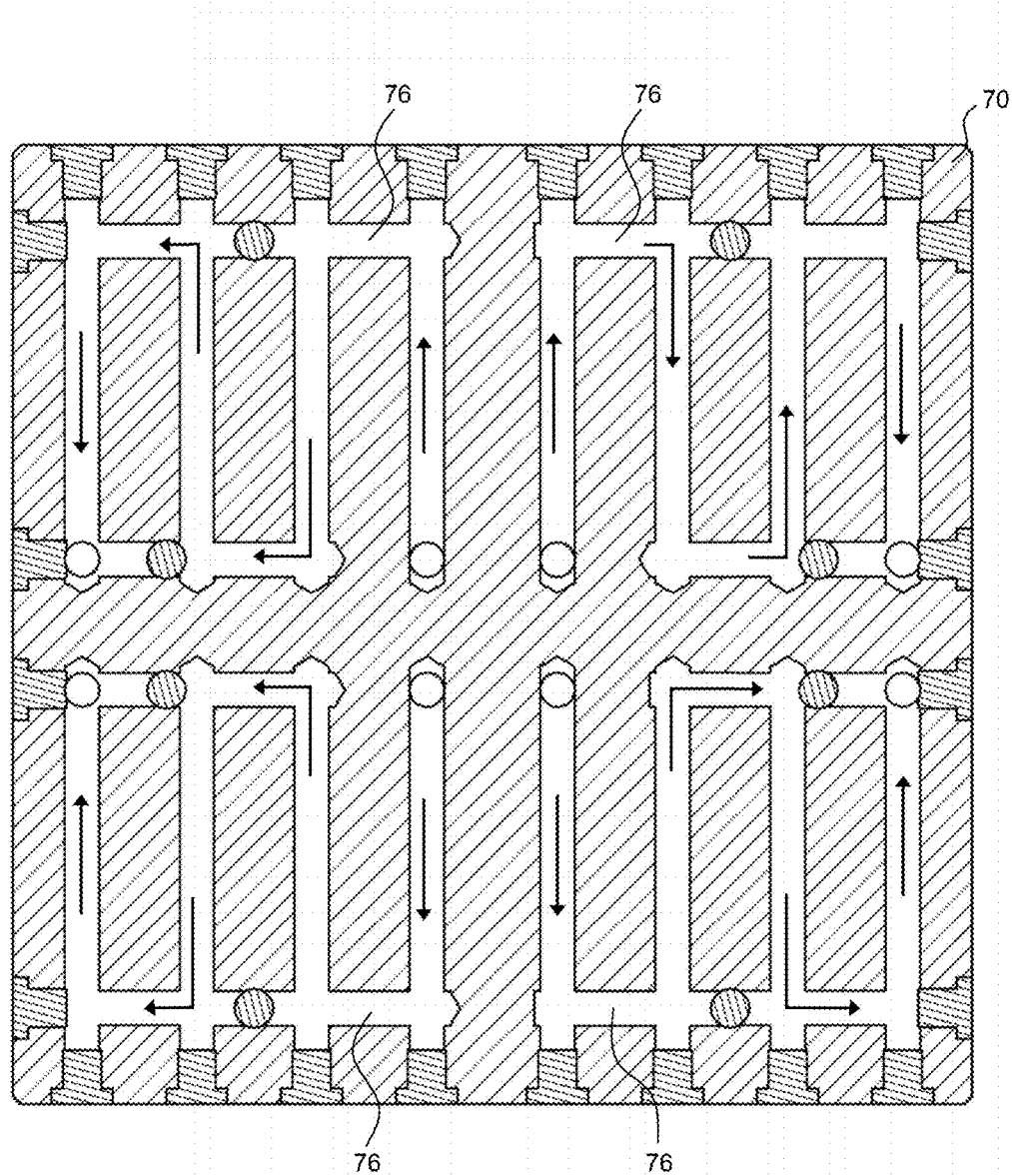
FIG. 6 is a cross-sectional view of a cooling plate 70.

The cooling plate 70 is maintained at the predetermined cooling temperature by, for example, a refrigerant whose temperature is adjusted to the predetermined cooling temperature. The cooling temperature is set to a suitable value according to the required method for producing the three-dimensional molded object. In this embodiment, the cooling temperature is about −20° C. In this embodiment, mixed liquid of ethylene glycol and water is used as the refrigerant, but an appropriate one may be selected according to the cooling temperature. As shown in FIG. 6, the cooling plate 70 includes a conduit 76 through which the refrigerant flows. A supply manifold 73 and a discharge manifold 74 communicating with the conduit 76 are respectively connected to a chiller 20 for circulating the refrigerant through a hose (not shown). The refrigerant adjusted to the predetermined cooling temperature in the chiller 20 flows from the supply manifold 73 into the conduit 76 through the hose, flows through the conduit 76, and is discharged from the discharge manifold 74. Thereby, the cooling surface 70a of the cooling plate 70 is cooled to the predetermined cooling temperature.

Preferably, the cooling device 65 further includes a rotary actuator 71. The rotary actuator 71 rotates the cooling plate 70 between a position in a recumbent state where the cooling surface 70a is along a horizontal direction and a position in a standing state where the cooling surface 70a is along a vertical direction. When the cooling by the cooling device 65 is not performed, the rotary actuator 71 sets the cooling plate 70 in the standing state shown in FIG. 7. When cooling by the cooling device 65 is performed, the rotary actuator 71 sets the cooling plate 70 in the recumbent state shown in FIG. 8. In this way, it is possible to prevent the cooling plate 70 from interfering when the solidified layer is formed by the irradiator 13 or when the solidified layer is processed by the processing unit 47. Moreover, it is possible that the flow of the inert gas in the front chamber 1f is not prevented as possible. The rotary actuator 71 is, for example, an air rotary actuator. Also, as the rotary actuator 71, other rotation mechanisms such as a hydraulic rotary actuator or an electric rotary actuator may be used.

Figure 9:
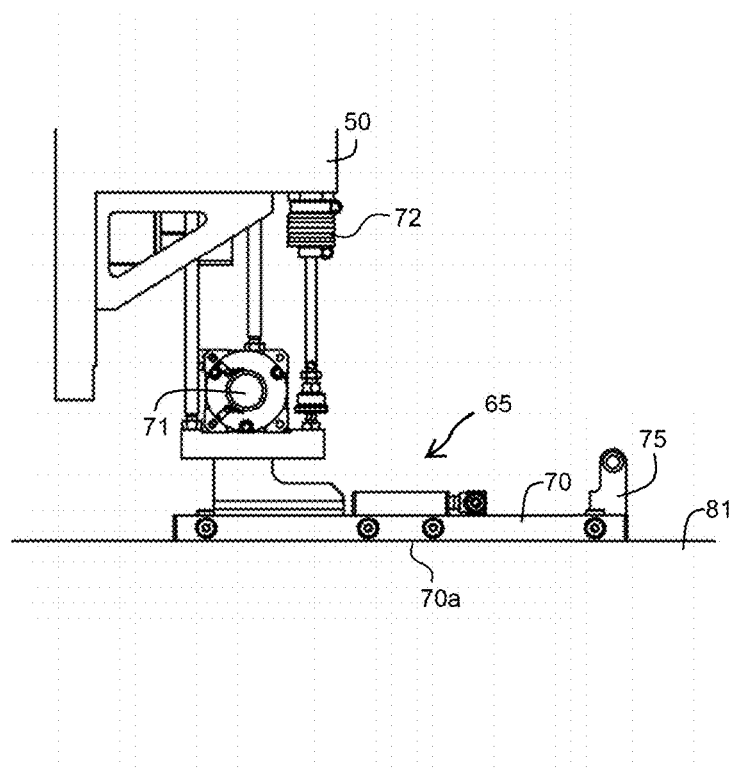
FIG. 9 is a side view of the cooling device 65 and the processing head 50 with the cooling plate 70 in the recumbent state and moved downward by a cooling plate elevator 72.

Preferably, the cooling device 65 further includes a cooling plate elevator 72. The cooling plate elevator 72 moves the cooling plate 70 in the vertical direction when the cooling plate is in the recumbent state. Technically, it is also possible to move the cooling plate 70 in the recumbent state in the vertical direction by the Z-axis driving unit 52c that moves the spindle 60 in the vertical direction. However, when the cooling plate 70 is contact with the upper surface of the solidified body 81 by the Z-axis driving unit 52c, a load is applied to the Z-axis driving unit 52c, and the accuracy of the processing by the processing unit 47 may be affected. Moreover, when the cooling plate 70 is moved by the Z-axis driving unit 52c, the Z-axis driving unit 52c needs to be enlarged. Therefore, it is desirable to provide the cooling plate elevator 72 so that the cooling plate 70 can be moved in the vertical direction independently. As shown in FIG. 9, the cooling plate elevator 72 moves the cooling plate 70 in the recumbent state in the vertical direction. The cooling plate elevator 72 is, for example, an air cylinder. Also, as the cooling plate elevator 72, other driving mechanisms such as a hydraulic cylinder or an electric motor may be used.

Figure 10:
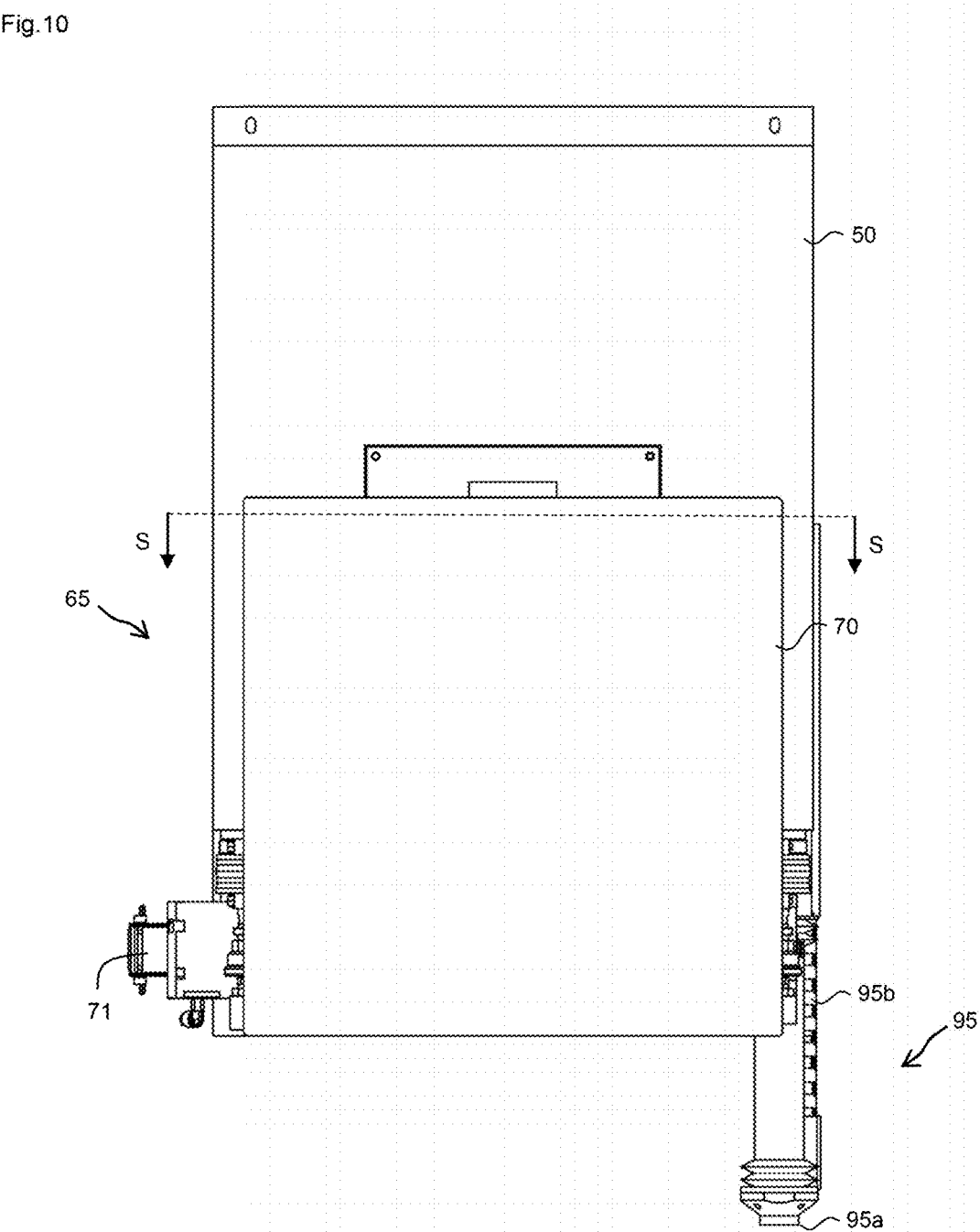
FIG. 10 is a front view of the cooling device 65 and the processing head 50 with the cooling plate 70 in the standing state.
Figure 11:
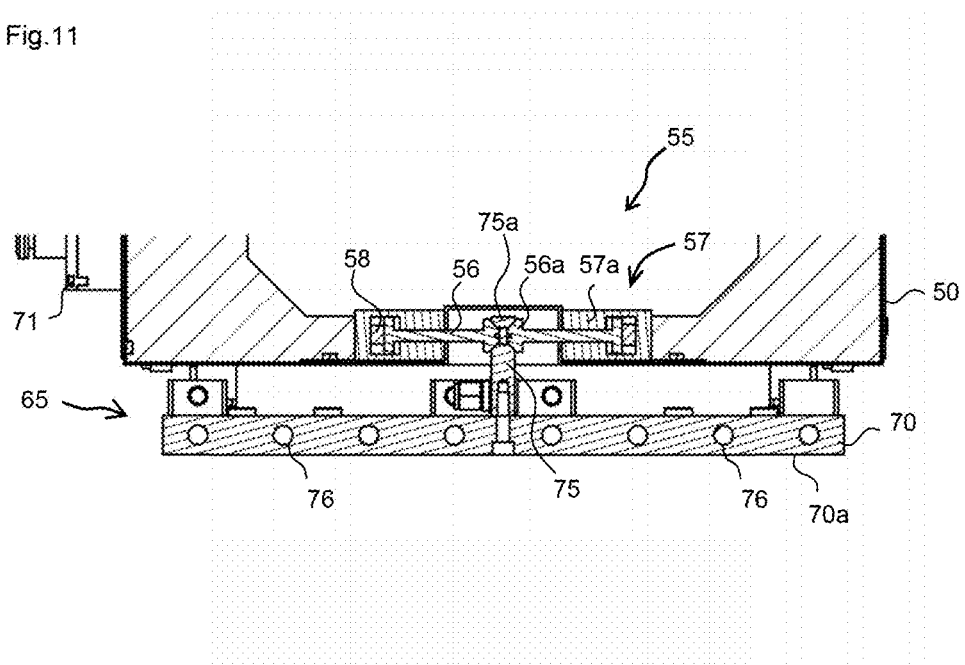
FIG. 11 is a cross-sectional view taken along a line S-S in FIG. 10.

As shown in FIG. 10 and FIG. 11, the processing head 50 and the cooling device 65 are provided with a lock mechanism 55 for fixing the cooling plate 70 in the standing state so as not to rotate to the position in the recumbent state. As the lock mechanism 55, a mechanism capable of maintaining the fixing of the cooling plate 70 is desirable even when power such as electricity or compressed air is stopped. Specifically, the lock mechanism 55 includes a locking member 75 provided on the cooling plate 70 and a cylinder 57 provided on the processing head 50. The locking member 75 may be provided on the processing head 50, and the cylinder 57 may be provided on the cooling plate 70. In this case, it is necessary to use the cylinder 57 that can withstand the cooling temperature. The cylinder 57 is, for example, a fluid pressure cylinder, and more specifically a single-acting air cylinder. In the present embodiment, a pair of cylinders 57 is provided, but the number of cylinders 57 is not limited as long as the cooling plate 70 can be sufficiently fixed. The cylinder 57 includes a piston 56, a cylinder tube 57a through which the piston 56 is inserted, and an elastic member 58.

The locking member 75 is provided with a locking portion 75a. The locking portion 75a is sandwiched by the piston 56. Then, the locking portion 75a provided in the locking member 75 is engaged with a tip 56a of the piston 56 so that the cooling plate 70 in the standing state may not rotate to the position in the recumbent state. The locking portion 75a only needs to have a shape that can engage with the tip 56a of the piston 56. The locking portion 75a is, for example, a part of the locking member 75 in which a groove, a non-through hole, or a through hole is formed.

The elastic member 58 is provided in the cylinder tube 57a through which the piston 56 is insert. The elastic member 58 always energizes the piston 56 in a direction so that the piston 56 engages with the locking portion 75a. The elastic member 58 is, for example, a spring. As described above, since the piston 56 is constantly energized by the elastic member 58, the cooling plate 70 can be fixed so as not to rotate even when power such as electricity or compressed air is stopped. Thus, safety in the molding process can be ensured.

The cylinder 57 moves the piston 56 in a direction in which the engagement between the locking portion 75a and the tip 56a of the piston 56 is released when the cooling plate 70 is rotated from the position in the standing state to the position in the recumbent state.

Preferably, the processing head 50 further includes a temperature measurement unit 95. The temperature measurement unit 95 has a temperature sensor that measures the temperature of the solidified body 81. The temperature measurement unit 95 in this embodiment includes a contact temperature sensor 95a that measures the temperature by contacting the upper surface of the solidified body 81, and a temperature sensor elevator 95b that moves the temperature sensor 95a in a vertical direction. The temperature sensor 95a is, for example, a thermocouple, but other temperature sensors such as a resistance temperature detector may be used. The temperature sensor elevator 95b is, for example, an air cylinder, but other driving mechanisms such as a hydraulic cylinder and an electric motor may be used. The temperature measurement unit 95 may include a non-contact temperature sensor instead of the contact temperature sensor 95a, but the temperature of the solidified body 81 can be measured more accurately by using the contact temperature sensor 95a. By using the temperature measurement unit 95, feedback control according to the temperature of the solidified body 81 can be performed. For example, a cooling step by the cooling plate 70 may be performed until the temperature measured by the temperature sensor 95a reaches the predetermined cooling temperature.

A method for producing the three-dimensional molded object using the lamination molding apparatus 100 will be described with reference to FIG. 12 to FIG. 15. Here, in FIG. 12 to FIG. 15, some of the components of the lamination molding apparatus 100 shown in FIG. 1 to FIG. 11 are omitted in consideration of visibility.

The lamination molding apparatus 100 of the present embodiment is particularly effective for a producing method of a three-dimensional molded object where a temperature of a solidified layer is adjusted during molding. As the producing method of the three-dimensional molded object where the temperature of the solidified layer is adjusted during molding, a molding method is examplified where a martensitic metal is used as a material for forming the material layer 8, and every time one or more solidified layers are formed, the temperature of the solidified layer is adjusted so that the martensitic transformation is intentionally advanced. More specifically, every time one or more solidified layers are newly molded, the temperature of the newly molded solidified layer(s) is adjusted in the order of a molding temperature T1, a cooling temperature T2, and the molding temperature T1. At this time, the molding temperature T1 is equal to or higher than a martensitic transformation finish temperature Mf of the solidified layer, the molding temperature T1 is higher than the cooling temperature T2, and the cooling temperature T2 is equal to or lower than a martensitic transformation start temperature Ms of the solidified layer. In addition, this invention is effective also in the other producing method of a three-dimensional molded object where the temperature of a solidified layer is adjusted during molding.

Hereinafter, one or a plurality of solidified layers cooled by the cooling device 65 is referred to as an upper surface layer. The upper surface layer includes at least the uppermost solidified layer of the solidified body 81 at each cooling time. After solidification, the upper surface layer before being cooled in the cooling step contains an austenite phase. The upper surface layer is cooled to the cooling temperature T2, and at least a part of the austenite phase is transformed into a martensitic phase.

Figure 12:
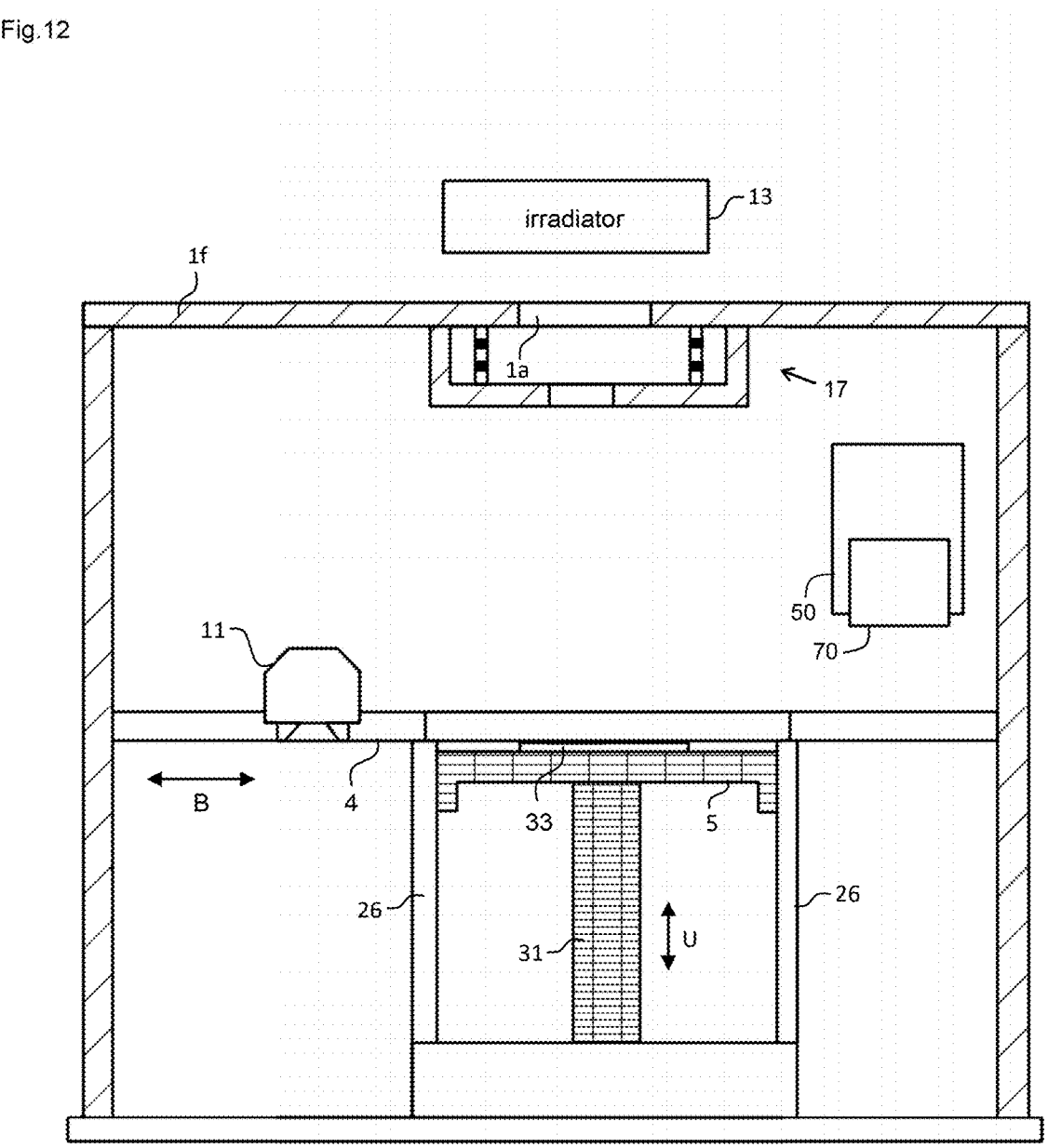
FIG. 12 is an explanatory diagram of a solidified layer forming step using the lamination molding apparatus 100 according to the embodiment of the present invention.

As shown in FIG. 12, the base plate 33 is placed on the molding table 5, and a height of the molding table 5 is adjusted to an appropriate position. After the height of the molding table 5 is adjusted, a solidified layer forming step is performed. In the solidified layer forming step, a recoating step and a solidifying step described below are performed once or more in a state where the temperature of the molding table 5 is set to the molding temperature T1 by the temperature adjusting mechanism provided in the molding table 5.

Figure 13:
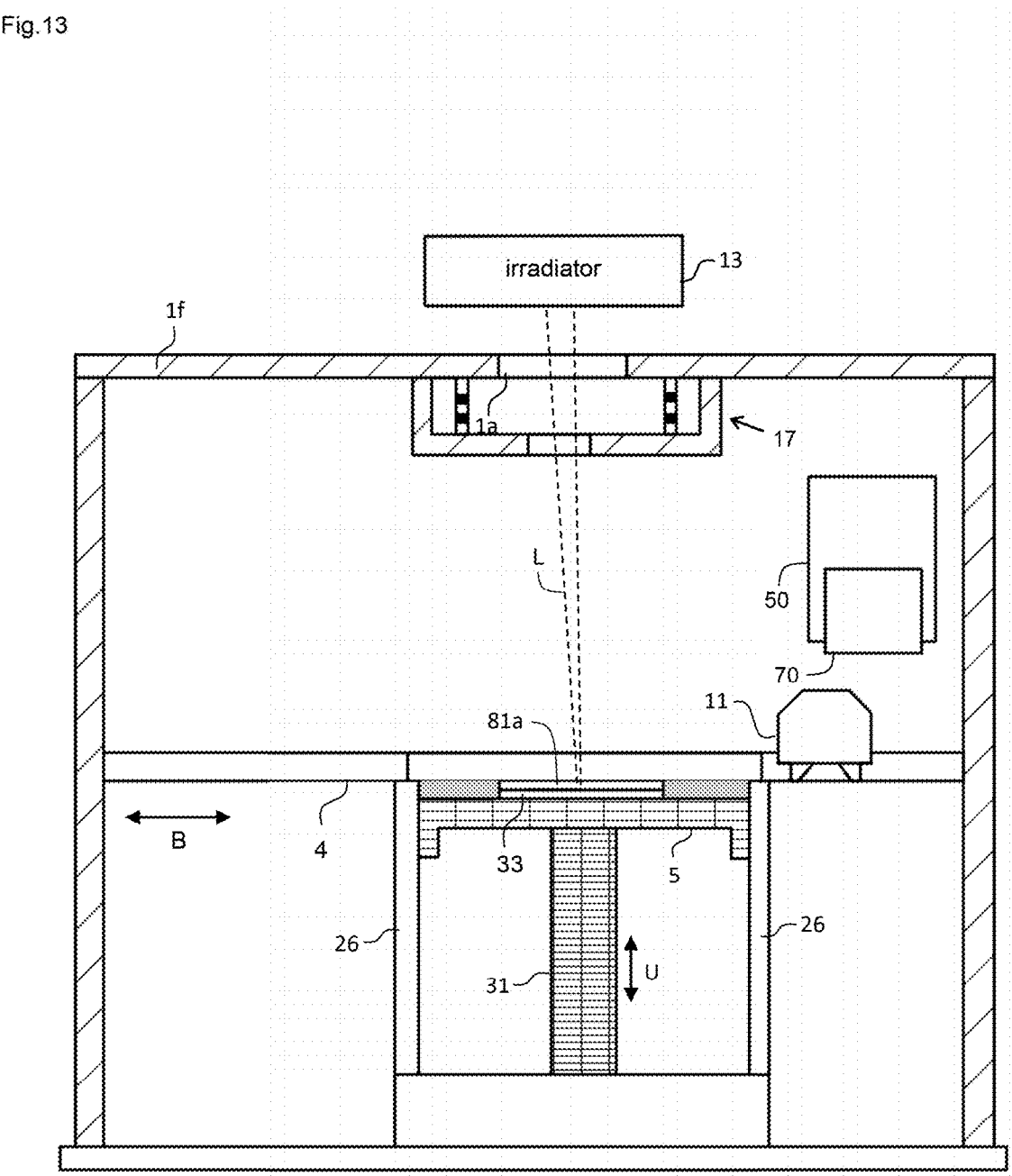
FIG. 13 is another explanatory diagram of the solidified layer forming step using the lamination molding apparatus 100 according to the embodiment of the present invention.

As shown in FIG. 13, in the recoating step, the recoater head 11 in which the material powder is filled in the material holding section 11a moves from a left side to a right side of the molding region R along the arrow B. In this way, the material layer 8 is formed on the base plate 33.

Next, in the solidifying step, the irradiation region of the material layer 8 is irradiated with the laser beam L. The material layer 8 in the irradiation region is melted or sintered, and the first solidified layer 81a is formed on the base plate 33.

Figure 14:
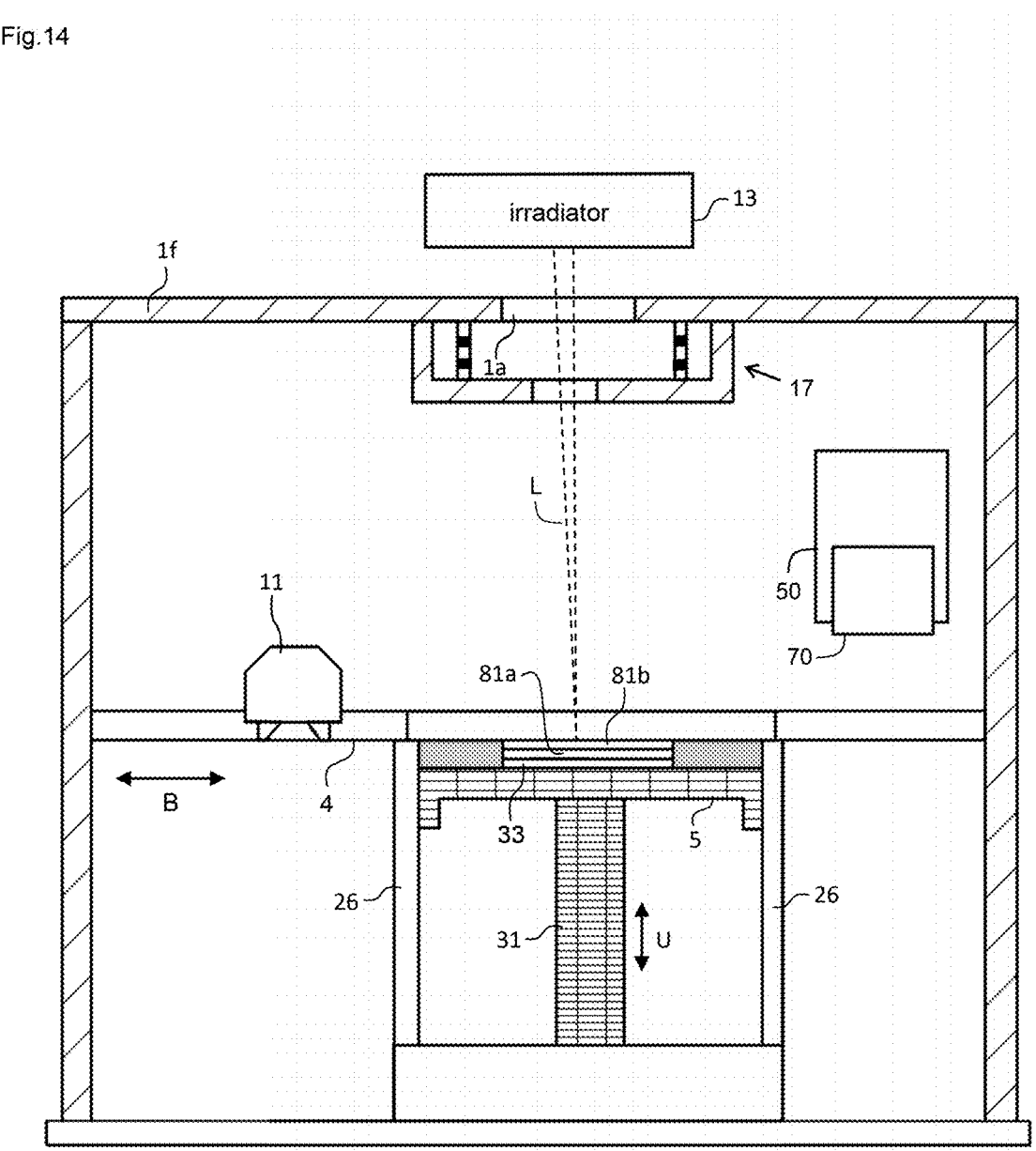
FIG. 14 is another explanatory diagram of the solidified layer forming step using the lamination molding apparatus 100 according to the embodiment of the present invention.

In the case that the cooling step is performed on a plurality of solidified layers, the height of the molding table 5 is reduced by the thickness of the material layer 8 as shown in FIG. 14, and the recoating step and the solidifying step are performed again. Specifically, the recoater head 11 moves from the right side to the left side of the molding region R, and the material layer 8 is formed on the molding region R. Then, the irradiation region of the material layer 8 is irradiated with the laser beam L, the material layer 8 in the irradiation region is melted or sintered, and the second solidified layer 81b is formed on the base plate 33.

In this way, in the solidified layer forming step, the solidified body 81 is formed by repeating the formation of a plurality of the solidified layers. These solidified layers which are sequentially laminated are firmly fixed to each other.

After the above steps are repeated to form one or more predetermined solidified layers, the cooling step is performed by the cooling device 65 provided on the processing head 50. In the cooling step, the temperature of the upper surface layer of the solidified body 81 is cooled to the cooling temperature T2.

Figure 7:
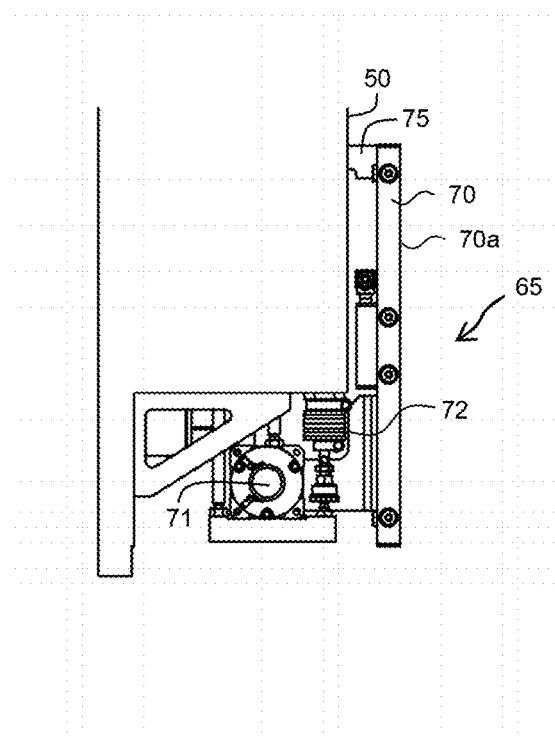
FIG. 7 is a side view of a cooling device 65 and the processing head 50 with the cooling plate 70 in a standing state.
Figure 15:
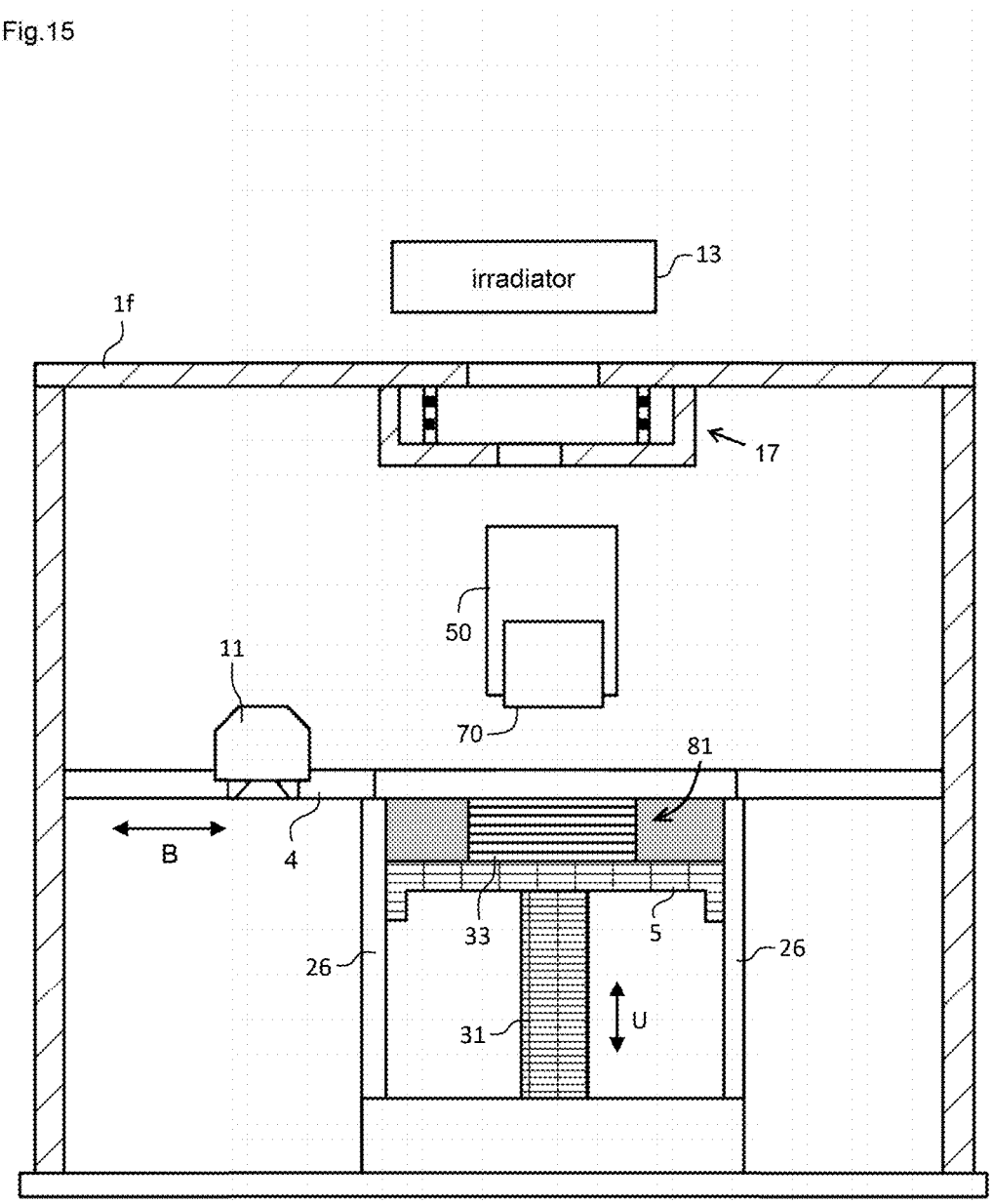
FIG. 15 is an explanatory diagram of a cooling step by the cooling plate 70.

In the cooling step, as shown in FIG. 15, at first, the X-axis driving unit 52a and the Y-axis driving unit 52b included in the processing head driver 52 place the processing head 50 above the solidified body 81. At this time, as shown in FIG. 7, the cooling plate 70 of the cooling device 65 provided on the processing head 50 is in the standing state.

Figure 8:
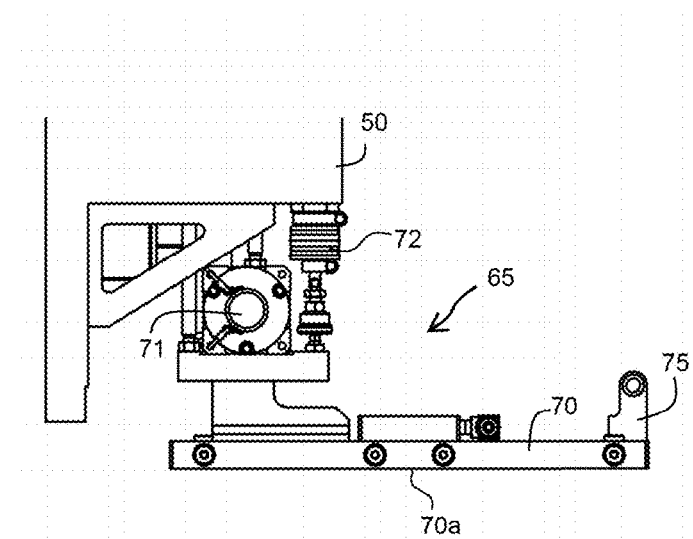
FIG. 8 is a side view of the cooling device 65 and the processing head 50 with the cooling plate 70 in a recumbent state.

Next, as shown in FIG. 8, the rotary actuator 71 rotates the cooling plate 70 to the position in the recumbent state. At this time, the cylinder 57 is activated, and the engagement is released between the locking member 75 provided on the cooling plate 70 and the piston 56 provided on the processing head 50.

Next, as shown in FIG. 9, the cooling plate elevator 72 moves the cooling plate 70 in the recumbent state downward in the vertical direction to make it close contact with the upper surface of the solidified body 81.

Then, the temperature of the upper surface layer of the solidified body 81 is cooled by the cooling plate 70. The timing when the chiller 20 starts to send the refrigerant whose temperature is set at the cooling temperature T2 into the conduit 76 in the cooling plate 70, may be before or after the timing when cooling plate 70 is close contact with the upper surface of the solidified body 81. As described above, the cooling temperature T2 is equal to or lower than the martensitic transformation start temperature Ms. Preferably, the cooling temperature T2 is equal to or lower than the martensitic transformation finish temperature Mf. By cooling the upper surface layer to the cooling temperature T2, it is possible to prevent the martensitic transformation of the three-dimensional molded object from proceeding after molding. In addition, specific values of the martensitic transformation start temperature Ms and the martensitic transformation finish temperature Mf vary depending on the composition of the material. Therefore, depending on the material, the cooling temperature T2 needs to be set to a low temperature such as about −20° C. In the lamination molding apparatus 100 of the present embodiment, since only a part of the solidified body 81 including the upper surface layer needs to be cooled, the upper surface layer can be rapidly cooled even when the cooling temperature T2 is low, and the temperature of the solidified body 81 can be quickly reheated to the molding temperature T1 after the cooling step.

In the cooling step, the heating of the molding table 5 by the temperature adjusting mechanism provided in the molding table 5 may be stopped. More preferably, the heater of the temperature adjusting mechanism is stopped and the temperature of the molding table 5 is lowered by the cooler. At this time, the molding table 5 only needs to be cooled to such an extent that excessive heat transfer to the solidified body 81 can be suppressed, and does not need to be cooled to the cooling temperature 2.

When the cooling step is completed, the cooling plate 70 of the cooling device 65 is moved upward in the vertical direction by the cooling plate elevator 72 and rotated from the position in the recumbent state to the position in the standing state by the rotary actuator 71. Then, the locking member 75 provided on the cooling plate 70 and the piston 56 provided on the processing head 50 engage with each other, so that the cooling plate 70 is fixed so as not to rotate unexpectedly. Thereafter, the temperature of the molding table 5 is set again to the molding temperature T1, and the solidified layer forming step is performed. Until at least the next solidifying step is performed, the temperature of the molding table 5 is adjusted to the molding temperature T1 by the temperature adjusting mechanism provided in the molding table 5, and the temperature of the material layer 8 is reheated to the molding temperature T1.

Further, every time a predetermined number of solidified layers are formed, a processing step of performing process by the processing unit 47 may be performed on the end surface of the solidified layer. Preferably, cutting process is performed on the upper surface layer after the cooling step. In this way, it is possible to cut the upper surface layer after the martensitic transformation has occurred and the size have been stabilized, so that the cutting can be performed with higher accuracy. More preferably, the cutting process is performed on the upper surface layer whose temperature is adjusted to ordinary temperature after the cooling step. In this way, cutting process can be performed on the upper surface layer while suppressing the influence of expansion or contraction due to temperature change, so that cutting process can be performed with higher accuracy.

As described above, in the present embodiment, in the cooling step, the temperature of the upper surface layer of the solidified body 81 is cooled by making the cooling plate 70 whose temperature is adjusted to the cooling temperature T2 into contact with the upper surface of the solidified body 81. In this way, unlike the case where cooling step is performed only by using the temperature adjusting mechanism provided in the molding table 5, it is not necessary to cool the whole molded object to the cooling temperature T2. Therefore, the upper surface layer can be cooled more quickly, and the molding time of the three-dimensional molded object can be shortened. Further, since the cooling device 65 is provided on the processing head 50, it is not necessary to provide another driving device for moving the cooling device 65 in the horizontal direction, and the cooling device 65 can be made relatively simple and small.

The solidified layer forming step, the cooling step, and the processing step described above are repeated to form the desired three-dimensional molded object. It is desirable that the three-dimensional molded object is cooled before the three-dimensional molded object is removed from the lamination molding apparatus 100. In cooling the three-dimensional molded object, the cooling plate 70 of the cooling device 65 can be cooled by contacting the upper surface of the three-dimensional molded object. At this time, the three-dimensional molded object may be cooled in cooperation with the temperature adjusting mechanism provided in the molding table 5.

What is claimed is:

1. A lamination molding apparatus, comprising:
   an irradiator irradiating a material layer with a beam to form a solidified layer, the material layer being formed for each of a plurality of divided layers obtained by dividing a desired three-dimensional molded object at a predetermined height;
   a processing unit including a processing head having a tool that performs processing on the solidified layer, and a processing head driver moving the processing head at least in a horizontal direction; and
   a cooling device provided in the processing head and cooling at least a part of a solidified body including an upper surface to a predetermined cooling temperature, the solidified body being formed by laminating the solidified layer;
   wherein the cooling device includes a cooling plate having a cooling surface being cooled to the cooling temperature, the cooling surface being in close contact with the upper surface of the solidified body in a recumbent state with the cooling surface along the horizontal direction.

2. The device of claim 1, wherein the cooling plate has a conduit through which a refrigerant flows.

3. The device of claim 2, further comprising:
   a chiller being connected to the conduit, the chiller adjusting a temperature of the refrigerant to the cooling temperature and circulating the refrigerant through the conduit.

4. The device of claim 1, wherein the cooling temperature is equal to or lower than a martensitic transformation start temperature of the solidified layer.

5. The device of claim 4, wherein the cooling temperature is equal to or lower than a martensitic transformation finish temperature of the solidified layer.

6. The device of claim 1, further comprising:
   a chamber covering the solidified body, the processing head and the cooling plate; and
   an inert gas supplier supplying inert gas to the chamber, the inert gas having a predetermined concentration and a dew point temperature lower than the cooling temperature.

7. The device of claim 1, wherein the cooling device further includes a cooling plate elevator moving the cooling plate in the recumbent state in a vertical direction.

8. The device of claim 1, wherein the cooling device further includes a rotary actuator rotating the cooling plate between a position in a standing state with the cooling surface along a vertical direction and a position in the recumbent state.

9. The device of claim 8, further comprising:
   a lock mechanism configured to fix the cooling plate in the standing state not to rotate to the position in the recumbent state.

10. The device of claim 9, wherein the locking mechanism includes a locking member having a locking portion provided on one of the cooling plate and the processing head, and a cylinder provided on the other of the cooling plate and the processing head,
    the cylinder has a piston having a tip engaged with the locking portion when the cooling plate is in the standing state, a cylinder tube through which the piston is inserted, and an elastic member constantly energizing the piston in a direction so that the piston engages with the locking portion, and
    the piston is configured to be moved in a direction so that the engagement with the locking portion is released, when the cooling plate is rotated from the position in the standing state to the position in the recumbent state.

11. The device of claim 1, further comprising:
a temperature measurement unit provided on the processing head and including a temperature sensor measuring the temperature of the solidified body.

12. The device of claim 11, wherein the temperature sensor is a contact temperature sensor measuring the temperature in contact with the upper surface of the solidified body, and
the temperature measurement unit further includes a temperature sensor elevator moving the temperature sensor in a vertical direction.

* * * * *